No. 702,550. Patented June 17, 1902.
J. L. GIROUX.
STEAM GENERATOR.
(Application filed Nov. 22, 1901.)
(No Model.) 2 Sheets—Sheet 1.

Witnesses, Inventor,
Joseph L. Giroux.

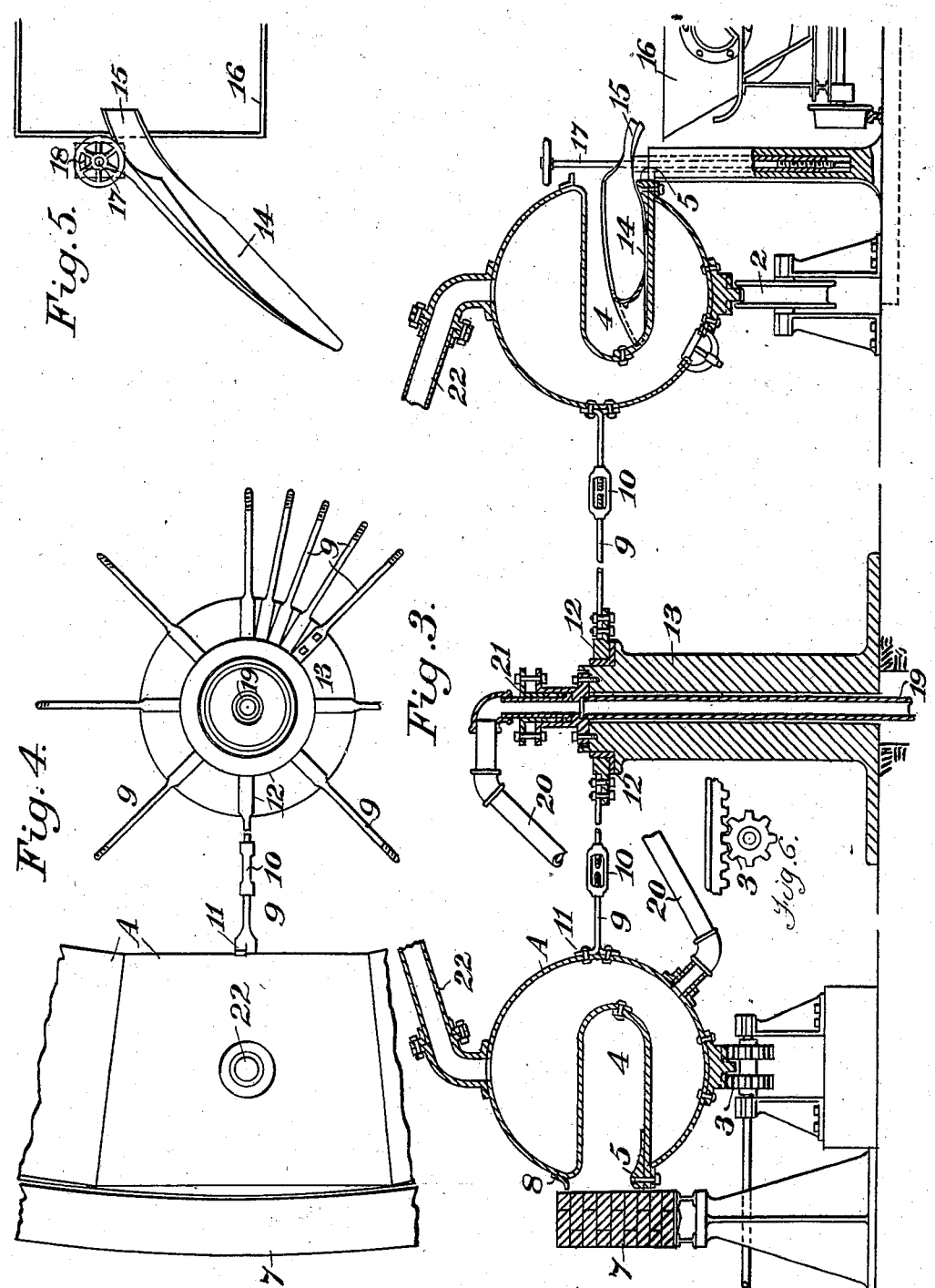

UNITED STATES PATENT OFFICE.

JOSEPH L. GIROUX, OF JEROME, ARIZONA TERRITORY.

STEAM-GENERATOR.

SPECIFICATION forming part of Letters Patent No. 702,550, dated June 17, 1902.

Application filed November 22, 1901. Serial No. 83,294. (No model.)

*To all whom it may concern:*

Be it known that I, JOSEPH L. GIROUX, a citizen of the United States, residing at Jerome, county of Yavapai, Arizona Territory, have invented an Improvement in Steam-Generators; and I hereby declare the following to be a full, clear, and exact description of the same.

My invention relates to an apparatus for generating steam; and it is especially designed for the employment of a fuel which can be continuously supplied and removed when exhausted.

My invention is especially designed for the utilization of the hot slag from smelting-furnaces and the like; but other forms of fuel may be employed in conjunction with a generator of this description.

It consists of an annular, tubular, and horizontally-revoluble shell having a continuous fire-box or furnace in the form of an open channel from one side and means for continously supplying the fuel at one point and means for removing it when the heat is exhausted.

My invention also comprises details of construction, which will be more fully explained by reference to the accompanying drawings, in which—

Figure 1:
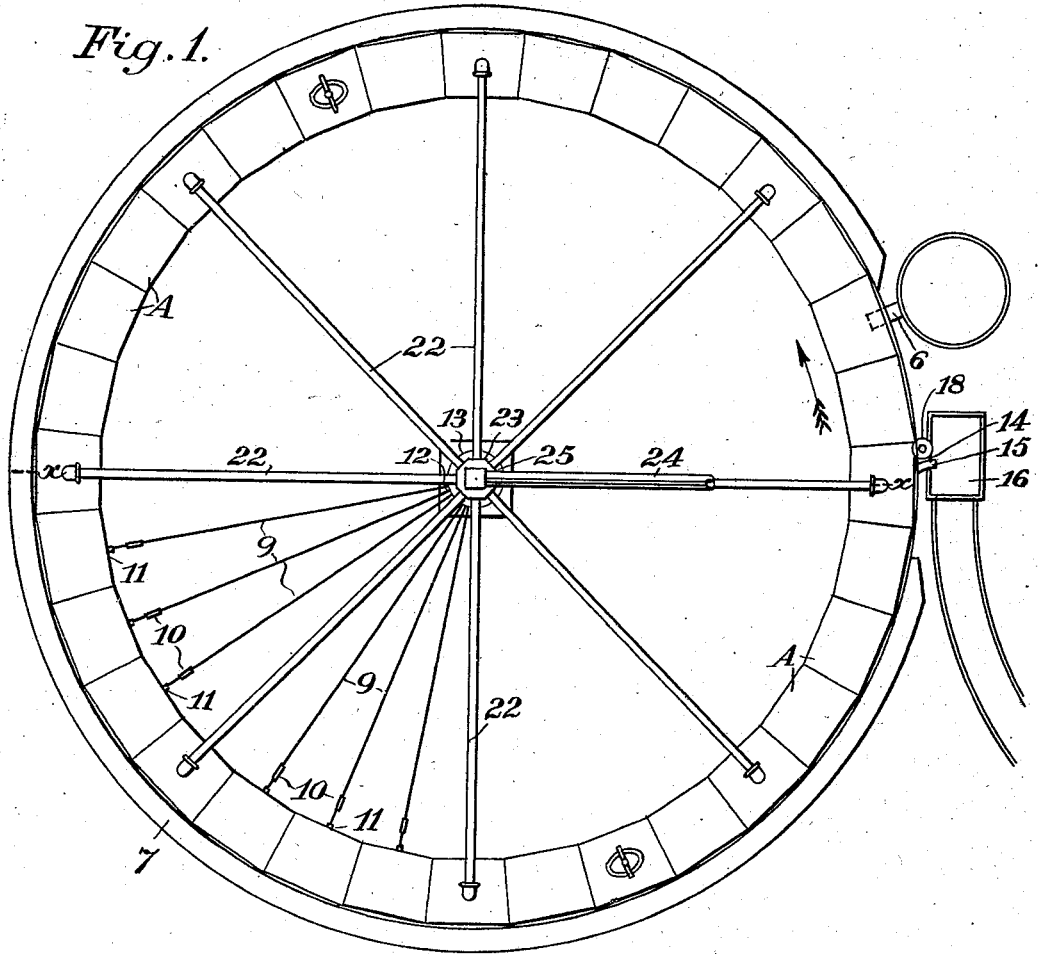
Figure 2:
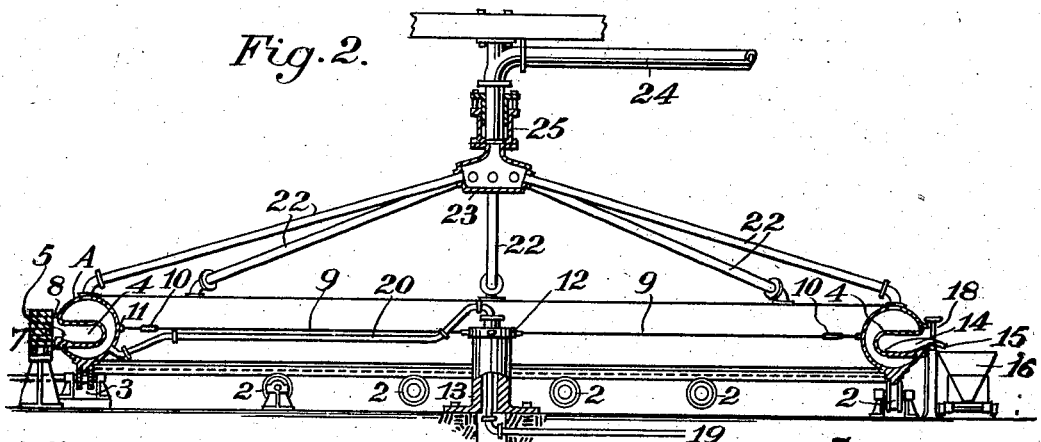

Figure 1 is a plan of my invention. Fig. 2 is a vertical section on the line *x x*, Fig. 1. Fig. 3 is an enlarged section of Fig. 2. Fig. 4 is a portion of a plan of Fig. 3. Fig. 5 is a plan of the scraper. Fig. 6 shows a detached part of the driving-rack and pinion.

The object of my invention is to provide a steam-generator of large capacity, and I have in the present illustration shown it as especially fitted for the employment of a fuel consisting of the hot molten slag which is discharged from smelting-furnaces; and the invention therefore comprises means for continuously supplying the slag into the peculiarly-disposed furnace of the generator, of revolving the generator and its furnace about a vertical axis, of a means for removing the slag or other fuel when exhausted, means for forming a closure for the furnace during its revolution and means for supplying water to the boiler and removing steam therefrom.

As shown in the present drawings, my generator is formed of short cylindrical sections A, which may be made of any suitable or desired form in transverse section. In the present case I have shown these sections as cylindrical, and they are so formed and riveted together that when complete the generator is in the form of a large annular cylindrical rim which is suitably supported upon a foundation with antifrictional bearings, as at 2, and a driving-rack engaged by gears, as at 3, or equivalent means whereby the tubular shell can be revolved around its center of rotation.

The furnace is in the form of an open horizontal channel 4, which extends from one side of the shell into the interior, as plainly shown in the cross-section. This furnace-chamber extends all the way around the periphery of the annular shell and is here shown as opening toward the outside for convenience in using the fuel, which will be hereinafter described. This furnace is suitably supported by stay-bolts in the usual manner of staying and supporting furnaces, but not here shown. I preferably make the lower part of the shell of the furnace of heavier metal than the upper part, and I have shown an elevated annular rim extending around the outer edge of the lower part of the furnace, as shown at 5, this rim forming a depression in the bottom of the furnace, which serves to hold a liquid fuel. In the present case I have designed to employ the hot slag discharged from smelting-furnaces, and for this purpose I have shown an inlet pipe or passage, as 6, which may lead from the settling tank or attachment of the furnace, in which the metal is separated from the slag. The slag is delivered through this passage into the generator-furnace previously described, and the generator is caused to revolve at a rate of speed depending upon its size and upon the length of time that the slag will retain its heat.

It will be understood that liquid hydrocarbon or other form of fuel could be used with good effect in a generator of this description, the operation being essentially the same as in the present illustration.

In order to retain the heat within the furnace, a wall is built, as shown at 7, surrounding the generator and close to its periphery, and in order to make a close joint between the periphery of the generator and the wall, inasmuch as the generator is here shown as being constructed of short straight sections which form a polygonal periphery, I have shown a plate of metal or other suitable material fixed to the generator above the mouth of the furnace, as shown at 8. The periphery of this plate is made as nearly circular as possible and is designed to travel in close proximity with the wall 7, so that it does not allow any appreciable amount of heat to escape. The wall is continuous around a generator, with the exception of the points of inlet and discharge.

In order to strengthen and properly brace the generator, I have shown tension-rods 9, with turnbuckles 10 or other equivalent means for adjusting them. The outer ends of the rods are firmly secured to the inner periphery of the annular generator-shell, as shown at 11, and the inner ends are secured to a hub, as at 12, which is mounted and turnable upon a central pillar or standard 13.

Where hot slag is employed for a fuel in this generator, it is admitted, as previously stated, through a passage at 6, and it is removed by means of a plow 14, which is fixed so as to project into the furnace and into the pathway of the slag. This plow is suitably curved, so that it scoops up the slag as the generator revolves and forces it out of the furnace, so that it will discharge through a mouth or chute, as at 15, and slag-cars, as 16, may be run upon a track beneath the discharge to receive the waste slag, which can be then carried off and dumped. If it is desired to raise or lower or otherwise adjust the slag-plow, it is effected by mounting it upon a frame, which is vertically adjustable by means of a screw-shaft 17, having a hand-wheel or means for turning at the top and a screw turnable in the threaded sleeve or nut, which carries the frame of the slag-plow or equivalent raising or lowering device, as shown at 18. In this manner the operation of the apparatus can be made continuous as long as the fuel is supplied.

In order to supply water to an apparatus of this description, I have shown the feed-water pipe 19 as extending up through the central pillar 13, having one or more branches, as 20, extending outwardly to the shell connecting therewith at as many points as may be found desirable. A suitable packed joint, as at 21, allows the radial portion 20 of the pipe to revolve about the stationary vertical portion 19. By a similar arrangement steam is withdrawn from the generator by means of steam-delivery pipes 22, connecting with the upper part of the boiler-shell or with steam-domes thereon, if found desirable. These pipes all lead to a common center 23, with which they connect, and this receiver connects with a main steam-delivery pipe, as at 24, which leads the steam to any point where it is desirable to use it. A turnable packed joint, as 25, allows of the movement of the branch pipes 22 with relation to the stationary delivery-pipe 24 and maintains a tight joint during the operation.

Having thus described my invention, what I claim, and desire to secure by Letters Patent, is—

1. An annular tubular horizontally-disposed steam-generator, and a furnace and means for supplying fuel continuously thereto.

2. An annular tubular horizontally-revoluble steam-generator shell, a furnace and means for continuously supplying fuel to the furnace.

3. An annular tubular horizontally-disposed shell having an annular channeled furnace around its periphery, and means for supplying fuel continuously to said furnace.

4. An annular tubular horizontally-revoluble generator having an annular channel-furnace formed around its periphery, means for supplying fuel to said furnace during the revolution of the generator.

5. An annular tubular horizontally-revoluble generator having an inwardly-projecting furnace-channel formed around its periphery, and a raised flange about the bottom of said channel to retain the fuel therein.

6. An annular tubular horizontally-revoluble shell, a furnace consisting of an annular channel formed in the side of the shell adapted to retain a molten or liquid fuel, a passage through which said fuel is admitted, a wall surrounding the shell and forming a closure for the open side of the furnace.

7. A horizontally-revoluble steam-generator having an open channel around its periphery forming a furnace, a wall surrounding the generator in close proximity with the mouth of the furnace, and a flange projecting above the furnace and revoluble in close proximity to the wall to maintain a tight joint.

8. A horizontally-revoluble steam-generator consisting of short tubular sections riveted together, a furnace consisting of a channel opening into the interior around the periphery of the generator, and means for supplying fuel thereto, a wall surrounding the generator and forming a closure for the open mouth of the furnace, and a flange secured above the furnace having a circular periphery turnable in close proximity with the furnace-wall to form a joint therewith.

9. An annular horizontally-revoluble steam-generator having a channeled annular furnace opening inwardly from the periphery, a track and antifrictional supports upon which said shell is borne and mechanism through which power is applied to revolve the shell.

10. An annular horizontally-revoluble steam-generator having an annular channeled furnace opening into the periphery thereof, antifrictional bearings and mechanism whereby the generator is revolved, a centrally-revoluble hub and rods extending radially therefrom having the outer ends fixed to the boiler-shell sections.

11. An annular horizontally-revoluble steam-generator having an annular channeled furnace upon the periphery, means for supplying fuel to said furnace, and means for removing the waste fuel therefrom.

12. An annular horizontally-revoluble steam-generator having an annular channeled furnace extending from the periphery to its interior, means for supporting and revolving the furnace, means for supplying fuel thereto and means for removing waste products therefrom, consisting of a fixed plow projecting into the furnace and the path of travel of the fuel whereby the latter is excavated and discharged.

13. An annular horizontally-revoluble steam-generator having a channeled annular furnace extending from the periphery into the interior, means for supplying fuel and removing waste products therefrom, means for feeding water consisting of a centrally-disposed pipe with branches extending therefrom to the peripheral generator and a turnable joint at the junction of the vertical and movable branches.

14. An annular horizontally-revoluble steam-generator having a channeled annular furnace extending from the periphery into the interior, means for supplying fuel and removing waste products therefrom, steam-pipes leading from the upper part of the boiler to a centrally-located turnable joint and a stationary conducting-pipe connecting with said joint.

15. An annular horizontally-revoluble steam-generator, means for supplying water thereto consisting of a stationary centrally-disposed pipe, pipes connecting said first-named pipe with the boiler, a packed joint turnable in unison with the pipes and forming a connection with the stationary pipe, steam-pipes converging from the upper part of the boiler and a centrally-located joint or coupling with which they connect, and a stationary conducting-pipe having a steam-tight connection with the turnable joint.

In witness whereof I have hereunto set my hand.

JOSEPH L. GIROUX.

Witnesses:
S. H. NOURSE,
JESSIE C. BRODIE.